United States Patent
Christians et al.

(10) Patent No.: US 12,212,186 B2
(45) Date of Patent: Jan. 28, 2025

(54) COOLING ARRANGEMENT FOR COOLING A STATOR FOR AN ELECTRIC MOTOR

(71) Applicant: ZF Friedrichshafen AG, Friedrichshafen (DE)

(72) Inventors: Martin Christians, Friedrichshafen (DE); David Wörzler, Langenargen (DE); Rayk Gersten, Friedrichshafen (DE); Stefan Spühler, Friedrichshafen (DE); Martin Jelinewski, Nonnenhorn (DE); Wolfgang Hübler, Wolpertswende (DE); Timo Hele, Tettnang (DE); Karlheinz Hoher, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 481 days.

(21) Appl. No.: 17/554,489

(22) Filed: Dec. 17, 2021

(65) Prior Publication Data
US 2022/0200371 A1  Jun. 23, 2022

(30) Foreign Application Priority Data
Dec. 18, 2020 (DE) .................. 10 2020 216 236.0

(51) Int. Cl.
*H02K 1/20* (2006.01)
*H02K 3/52* (2006.01)
*H02K 9/16* (2006.01)

(52) U.S. Cl.
CPC .............. *H02K 1/20* (2013.01); *H02K 3/521* (2013.01); *H02K 9/16* (2013.01)

(58) Field of Classification Search
CPC ............ H02K 1/20; H02K 3/521; H02K 9/16; H02K 9/19; H02K 1/32; H02K 1/165; H02K 3/24
See application file for complete search history.

(56) References Cited

U.S. PATENT DOCUMENTS

| 2010/0176669 A1* | 7/2010 | Houle ................ H02K 9/227 310/54 |
| 2012/0112572 A1 | 5/2012 | Le Besnerais et al. |

(Continued)

FOREIGN PATENT DOCUMENTS

| DE | 10 2009 034 235 A1 | 2/2011 |
| DE | 10 2012 022 452 A1 | 5/2015 |

(Continued)

OTHER PUBLICATIONS

English translation of DE 10 2012 022 452 A1 (Year: 2014).*
(Continued)

*Primary Examiner* — Tulsidas C Patel
*Assistant Examiner* — Joshua Kiel M Rodriguez
(74) *Attorney, Agent, or Firm* — Finch & Maloney PLLC

(57) ABSTRACT

A cooling arrangement for cooling a stator for an electric machine. The cooling arrangement comprising a stator fixedly mounted relative to a rotational axis. The stator comprises a stator yoke and stator grooves. Windings are provided in the stator grooves, which form first and second winding heads. First and second fluid rings are provided at opposite ends on the stator yoke. The first fluid ring has a fluid inflow opening from a stator housing. The stator yoke has a plurality of axial stator ducts extending in the axial direction, which enable the inflowing fluid to flow through from the first fluid ring to the second fluid ring, and the second fluid ring redirects some of the fluid.

19 Claims, 4 Drawing Sheets

(56) References Cited

U.S. PATENT DOCUMENTS

2015/0244223 A1* 8/2015 Lee .................... H02K 3/22
                                                310/54
2018/0241289 A1* 8/2018 Desbiens ............ H02K 5/203
2022/0200371 A1   6/2022 Christians et al.

FOREIGN PATENT DOCUMENTS

DE    10 2019 218 883 A1    6/2021
GB           2500040 A  *   9/2013  ............ H02K 9/19

OTHER PUBLICATIONS

German Patent Office, Search Report issued in German patent application No. 10 2022 213 189.4 (Nov. 10, 2023).
German Search Report Corresponding to 10 2020 216 236.0 mailed Sep. 15, 2021.

* cited by examiner

A →

COOLING ARRANGEMENT FOR COOLING A STATOR FOR AN ELECTRIC MOTOR

This application claims priority from German Patent Application Serial No. 10 2020 216 236.0 filed on Dec. 18, 2020.

FIELD OF THE INVENTION

The invention relates to a cooling arrangement for cooling a stator for an electric machine, comprising a stator which is fixedly mounted around a rotational axis, wherein the rotational axis defines an axial direction and a radial direction radial relative to the axial direction, wherein the stator comprises a stator yoke and stator grooves, wherein the stator yoke extends around the rotational axis in the radial direction and in the axial direction, wherein the stator grooves are arranged on the stator yoke facing toward the rotational axis, wherein the stator grooves extend in the axial direction, and wherein windings are provided in the stator grooves, which windings, in each case, form a first winding head and a second winding head in the axial direction at the ends. In addition the invention relates to an electric machine.

BACKGROUND OF THE INVENTION

Electric machines, which comprise a rotor and a stator that surrounds the rotor, nowadays have to satisfy strict requirements. The electric machines, particularly those used in motor vehicles, must deliver high torques while occupying the least possible fitting space. This results in a high current density in the windings of the rotor and stator, which leads to thermal losses and a lot of waste heat. However, that can compromise the performance of the electric machine. To reduce the waste heat produced by the electric machine, the rotor and stator are cooled. For that purpose, for the stator in particular air or water are used. For example, the stator can be cooled on the outside by a water jacket. However, that takes up a lot of fitting space.

DE 10 2009 034 235 A1 discloses a stator of a hybrid or electric vehicle, which has a plurality of essentially ring-shaped stator segments whose axes are essentially directed radially, with a cooling device for cooling the stator. The cooling device comprises ribs formed in the stator segments such that the ribs form cooling ducts, wherein the stator has a stator support, the stator segments and the stator support being orientated relative to one another and the stator support being designed in such a manner that the cooling device is delimited by the stator support.

DE 102012022452A1 discloses an electric machine, in particular for a drive-train of a motor vehicle, with a machine housing, with a stator fixed in relation to the machine housing, with a rotor mounted to rotate relative to the machine housing, and with a cooling arrangement having at least one cooling duct arranged in the area of an outer periphery of the stator, through which a cooling fluid can be passed.

In this case, a plurality of cooling ducts are arranged in the area of the outer periphery of the stator such that at least two of the cooling ducts are connected to one another, in the area of their ends, to form a meander arrangement, and such that, in the area of the outer periphery of the stator, a plurality of such meander arrangements are located, which are connected in parallel to a fluid supply device.

SUMMARY OF THE INVENTION

An objective of the present invention is to achieve a cooling arrangement that enables better cooling while, at the same time, taking up little fitting space. In addition, an objective is an electric machine with such a cooling arrangement.

The objective is achieved by a cooling arrangement having the features specified below. Furthermore, the objective is achieved by an electric machine having the features specified below. Advantageous further developments, which can be used in isolation or in combination with one another, are indicated in the dependent claims and in the description.

The objective is achieved by a cooling arrangement for cooling a stator for an electric machine, which comprises a stator fixedly mounted around a rotational axis such that the rotational axis defines an axial direction and a radial direction that extends radially relative to the rotational axis, the stator having a stator yoke and stator grooves, wherein the stator yoke extends around the rotational axis in the radial and axial directions and the stator grooves on the stator yoke are arranged facing toward the rotational axis, the stator grooves extending in the axial direction, wherein windings are provided in the stator grooves, which windings respectively form a first winding head and a second winding head at their ends in the axial direction, wherein a first fluid ring and a second fluid ring are provided, such that the first fluid ring is positioned at one end on the stator yoke and the second fluid ring is positioned at the opposite end on the stator yoke, wherein the first fluid ring has at least one inlet opening for fluid to flow in from a stator housing which at least partially surrounds the stator, and wherein in the axial direction the stator yoke has a plurality of axial stator ducts designed so that the incoming fluid can flow through from the first fluid ring to the second fluid ring, and the second fluid ring is designed to receive and also redirect the fluid.

Fluid rings are understood to be annular ducts designed to convey a fluid, for example oil.

Stator grooves can be formed by stator teeth arranged on the stator yoke, which are arranged spaced apart from one another in the radial direction.

Relative to the stator yoke, the two fluid rings can be centered and orientated by means of stator fixing means arranged on the stator.

By virtue of this cooling arrangement, cooling can be achieved without having to provide or modify axial or radial fitting space. Thus, the components involved in the design can remain the same. In particular, by feeding in the fluid from only one end side of the stator, the existing fitting space can be optimally used.

By virtue of the cooling arrangement according to the invention, an outer diameter of the stator is not affected. Rather, due to the omission of a water-cooling jacket the outer diameter of the stator, i.e., the stator itself can be made larger for the better utilization of the volume, which increases the efficiency.

Preferably, on the side of the first fluid ring facing away from the stator yoke a further all-round additional ring is provided and arranged, which has an all-round fluid groove open toward the stator housing for receiving the fluid from the stator housing. In that way, a simple fluid transfer, in this case oil transfer, from the stator housing can be ensured. Also preferably, a seal is arranged between the stator housing and the additional ring, which seal prevents the escape of fluid (oil). Preferably, the first fluid ring and the additional ring are arranged as if between a winding head and the stator yoke. In that way, no further axial fitting space is needed.

Also preferably, the first fluid ring has at least one opening and the additional ring has at least one breakthrough duct from the fluid groove to the said at least one opening for the fluid to flow from the fluid groove into the first fluid ring, so that the at least one inlet opening is formed by the fluid groove, the at least one breakthrough duct and the at least one opening.

In that way, a more simple transport of the fluid, such as oil, from the fluid groove through the at least one breakthrough duct to the opening, and through the opening into the first fluid ring, is made possible. The breakthrough duct or ducts can be bores.

Preferably several openings are provided, which are in the form of slots distributed around the circumference. In this case, four slots are sufficient for a rapid and simple filling process.

Owing to the arrangement on the stator housing, the stator housing acts to exert an axial contact pressure on the additional ring against the first fluid ring. This ensures axial fixing.

In a preferred embodiment, the additional ring at least has a surface, this surface at least consisting of an insulating, non-conductive material. Also preferably, the first and second fluid rings too have surfaces consisting of an insulating, non-conductive material. This enables them to be brought closer to the windings and the winding heads.

The fluid rings and also the additional ring are integrated in the fitting space currently used as air insulation. This makes it possible not to modify the previous dimensions of the surrounding components. Thanks to this design, optimum utilization of the fitting space available can be ensured.

Preferably, the additional ring consists of an insulating, non-conductive material. The first and second fluid rungs can also consist of an insulating, non-conductive material. This also makes it possible for them to be positioned close to the windings and winding heads. By virtue of this design, the creeping distance to surrounding components can be maintained without any negative influences on the effectiveness of the cooling.

In a further embodiment, the first fluid ring and the additional ring can be made integrally, as one piece. In that way, for example seals between the first fluid ring and the additional ring can be dispensed with.

Preferably, the first fluid ring and the additional ring are made as two parts, wherein the additional ring is designed and arranged in such a manner that the additional ring can be pressed in the axial direction by the stator housing against the first fluid ring. This makes for secure axial fixing. Furthermore, thanks to this arrangement, it can be ensured that no additional axial or radial fitting space is needed. In another preferred embodiment, redirection ducts are provided in or on the second fluid ring, wherein first axial stator ducts are arranged so that they lead into the said redirection ducts, the redirection ducts further being arranged so that they lead into second axial stator ducts so that fluid flowing from the first fluid ring through the first axial stator ducts to the second fluid ring can be redirected by the redirection ducts and can flow back through the second fluid ring into the first fluid ring.

The first axial stator ducts are understood to be a first number of axial stator ducts. Analogously, the same applies to the second and third axial stator ducts.

By virtue of these redirections or convolutions, the stator yoke and above all the windings in the stator grooves can be cooled particularly effectively, and this, with a fluid which can flow or be fed in exclusively from one side. Thus, there is no need for feeding from both sides.

Preferably, the first fluid ring has an all-round closed lower ring duct, and the second axial stator ducts are arranged so that they lead into the said lower ring duct.

Also preferably, the lower ring duct has first outlet openings. In this case, the said first outlet openings are arranged, in particular, radially above the first winding head relative to the rotational axis, so that a wetting of the first winding head by the fluid flowing through the first outlet openings is made possible.

Radially above means here that the first outlet openings are arranged on a larger radius than the winding head relative to the rotational axis, as if close to an outer shell of the stator.

Thus, the number of first axial stator ducts and the number of second axial stator ducts are identical. The fluid flowing from the first fluid ring through the first axial stator ducts to the second fluid ring is directed by the redirection ducts into the second axial stator ducts, and then flows back through the second axial stator ducts into the first fluid ring.

Thus, the first fluid ring has two ducts, one for the fluid flowing in from the additional ring, and the lower ring duct in which the fluid flowing back from the second fluid ring flows into the second axial stator ducts.

In this case, the first outlet openings are arranged radially above the first winding head relative to the rotational axis, so that cooling of the first winding head by emerging or flowing fluid is made possible. The fluid drops along the first winding head and cools it. Thus, the first winding head is cooled in its upper area, while the fluid flows along the first winding head and thereby cools it.

Here, radially above means that the first outlet openings are on a larger radius than the winding heads in relation to the rotational axis.

By virtue of the arrangement of the first outlet openings, the fluid can flow out almost without being under pressure, under the action of gravity.

By virtue of this interconnection of the first fluid ring, the first axial stator ducts and the second axial stator ducts with one another, the same oil can be used to cool the stator yoke and, on the other hand, the first winding head. Again therefore, efficient cooling is achieved with little fluid.

In a further preferred embodiment third axial stator ducts are arranged in such a manner that they open into the second fluid ring. For this, the second fluid ring has inlets, for example bores. Moreover, the second fluid ring has second outlet openings.

Furthermore, the second outlet openings are preferably arranged radially above the second winding head relative to the rotational axis, so that the second winding head can be wetted by fluid flowing through the second outlet openings.

This enables efficient cooling of the stator yoke and windings in the stator grooves as well as the second winding head.

Here, radially above means that relative to the rotational axis, the second outlet openings are on a larger radius than the winding heads.

Owing to the to-and-fro movement of the oil flow, the volume flow can be reduced. Thus, already with a relatively small quantity, for example around 8 l/min, the stator and, at the same time, the winding heads can be cooled.

Furthermore, cooling from outside with only one inlet is possible. This saves fitting space since no feed lines are needed.

Preferably, the number of first axial stator ducts is equal to the number of third axial stator ducts and the number of second axial stator ducts is equal to the number of first axial stator ducts. Moreover all the axial stator ducts can be arranged parallel and made geometrically almost identical. That ensures uniform cooling of the winding heads.

Preferably the second fluid ring is made as two parts. This is particularly the case when the second winding head has a wide head diameter. This enables retroactive fitting.

Preferably, the axial stator ducts are arranged in the area of the stator grooves. This ensures efficient cooling of the windings.

Also preferably, the fluid is oil. This enables particularly good cooling and, at the same time, cooling of the winding heads.

In a further preferred embodiment, the first and second fluid rings are adhesively bonded to the stator yoke. By bonding the first and second fluid rings to the stator yoke, retroactive and simple fitting is made possible. In addition the stated objective is achieved by an electric machine with a cooling arrangement as described above for operating a vehicle.

This enables efficient cooling in the vehicle.

BRIEF DESCRIPTION OF THE DRAWINGS

Further features and advantages of the present invention emerge from the description given below, with reference to the attached figures which show, in a schematic manner.

DETAILED DESCRIPTION OF THE PREFERRED EMBODIMENTS

Although the invention has been illustrated and described in detail more completely by the preferred example embodiments, the invention is not limited to the examples disclosed.

Figure 5:
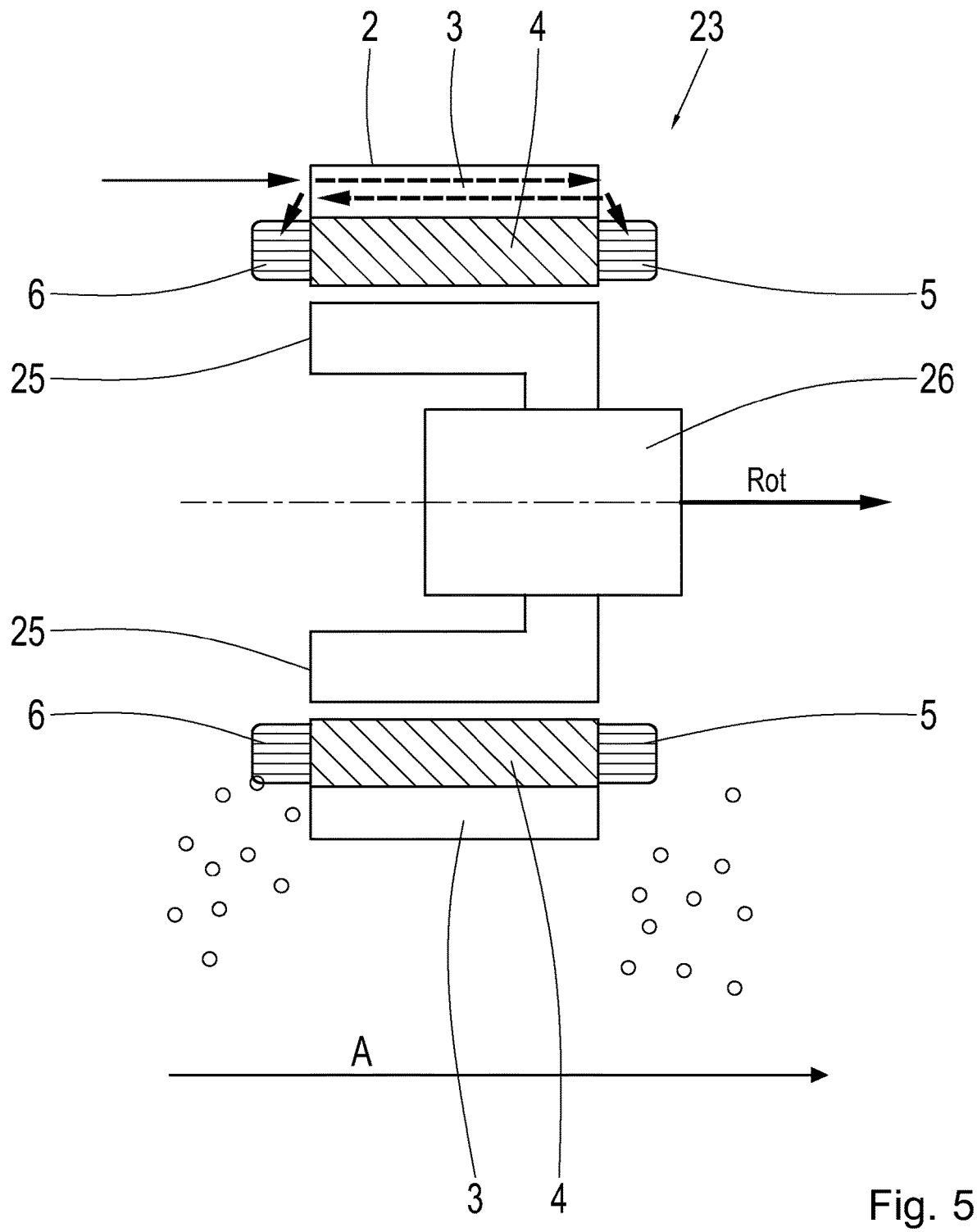
FIG. 5: An electric machine, shown schematically.

The cooling arrangement 1, according to the invention, comprises a stator 2, which is fixedly mounted relative to a rotational axis Rot (FIG. 5). The stator 2 has a stator yoke 3, which extends in a radial direction R around the rotational axis Rot. In addition, it extends in an axial direction A also around the rotational axis Rot. Here, the axial direction A is understood to be a direction parallel to and along the rotational axis Rot. The radial direction extends in the direction of the radius of the stator 2.

Starting from the stator yoke 3, stator grooves 4 are arranged facing toward the rotational axis Rot, the said stator grooves 4 extending in the axial direction A. Windings are arranged in the stator grooves 4, which at each end, also called the end sides, form respectively a first winding head 5 and a second winding head 6. In this case, the winding heads 5, 6 have different sizes. Moreover, the stator 2 can also have stator teeth, which are not included here.

The stator 2 is partially surrounded by a stator housing 7. According to the invention, the stator 2 is cooled by a fluid, in this case oil.

According to the invention, the cooling arrangement 1 comprises a first fluid ring 8. The first fluid ring 8 is arranged at one end on the stator yoke 3 and is designed, in particular, for carrying a fluid, in particular oil. The arrangement of the first fluid ring 8 on the stator yoke 3 is effected, in particular, by bonding with an adhesive. In that way a material-merged connection can be produced.

The first fluid ring 8 is centered on the stator yoke 3. In particular, the stator yoke 3 can be in the form of a sheet pack consisting of ring-shaped stator sheets stacked in the axial direction A. The first fluid ring 8 is then centered on the sheet pack, so that tolerances can be summed up directly from the components directly involved. In addition, stator fixing means (FIG. 4) can be provided, which can also be centered.

Furthermore, the cooling arrangement 1 comprises an additional ring 9 (FIGS. 2 and 3), which is arranged on the first fluid ring 8. The additional ring 9 and the first fluid ring 8 are, in this case, made as two parts, but they can also be made integrally as one part.

Figure 2:
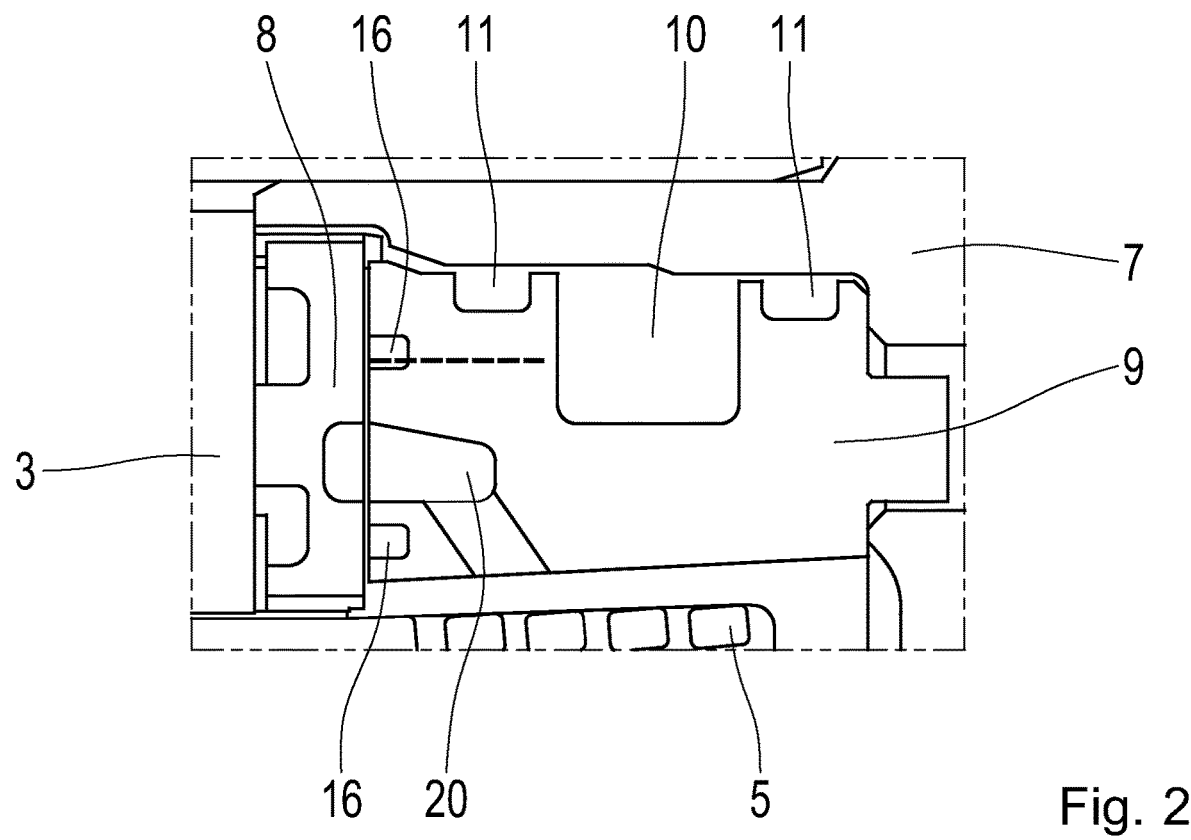
FIG. 2: An additional ring and a fluid ring, in detail.
Figure 3:
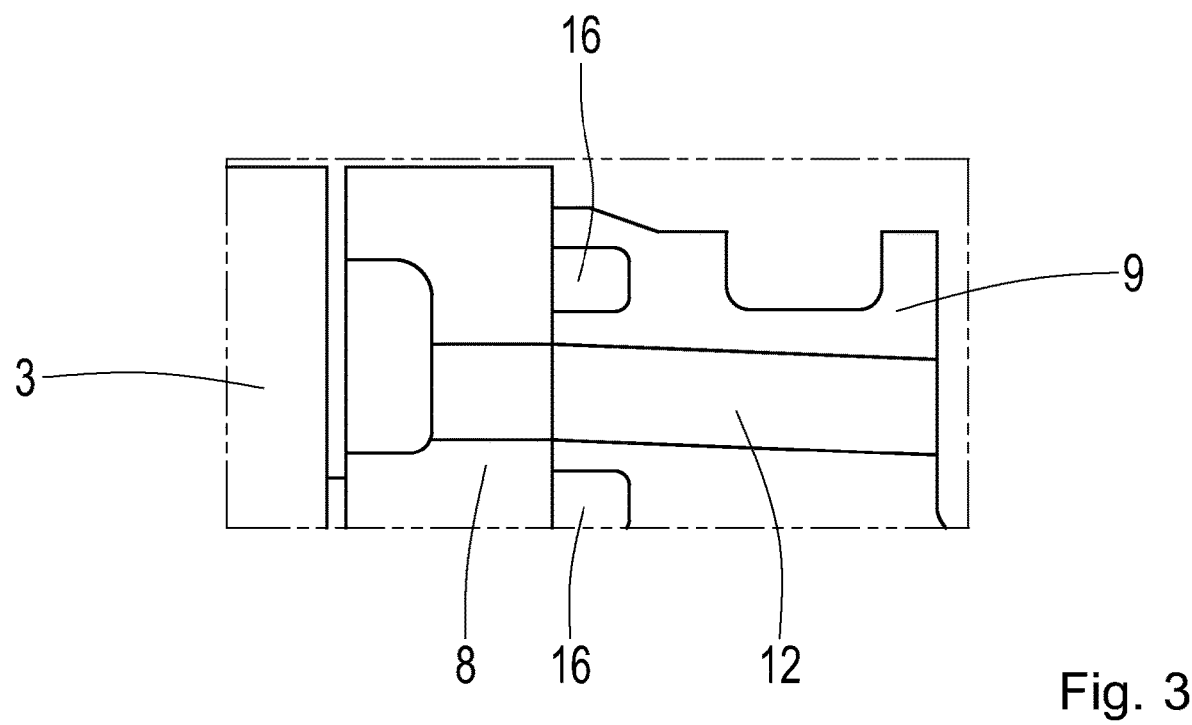
FIG. 3: The additional ring, shown in a detailed section.

FIGS. 2 and 3 show the additional ring 9 in detail.

Figure 4:
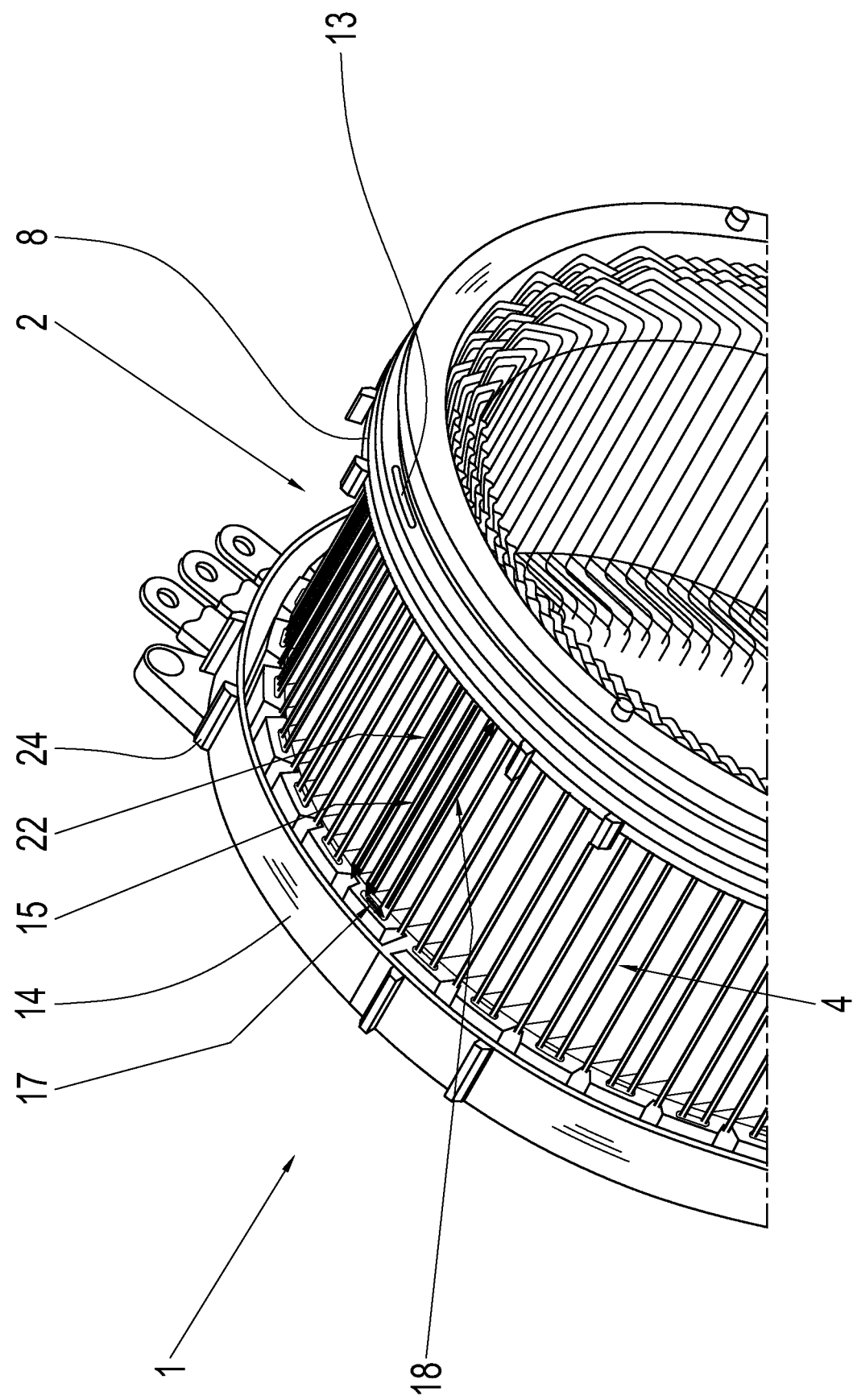
FIG. 4: The cooling arrangement, shown schematically.

The additional ring 9 has an all-round fluid groove 10, such that oil from the stator housing 7 can flow into the all-round fluid groove 10. A seal 11 is arranged between the additional ring 9 and the stator housing 7, which prevents any escape of oil between the stator housing 7 and the additional ring 9. The first fluid ring 8 also has openings 13 (FIG. 4). In this case these are in the form of slots. In particular, the first fluid ring has four such slots, but is not limited to that number.

Furthermore, the additional ring 9 has breakthrough ducts 12 (FIG. 3), which are designed to direct the oil. These extend from the fluid groove 10 (FIG. 2) to the openings 13 (FIG. 4), namely, in this case the four slots, and serve to lead the fluid from the all-round groove 10 through one of the breakthrough ducts 12 (FIG. 3) to the first fluid ring 8. A frame seal 16 (FIG. 3) is arranged between the first fluid ring 8 and the additional ring 9, which can prevent the oil from flowing out between the first fluid ring 8 and the additional ring 9. If the additional ring 9 and the first fluid ring 8 are made as one piece, the said frame seal 16 (FIG. 3) can be omitted.

The intermediate ring 9 and the first fluid ring 8 are arranged in the stator housing 7 in such a manner that the additional ring 9 is pressed axially against the first fluid ring 8. In that way the absence of any leak can be ensured.

Thus, preferably the additional ring 9 and also the first fluid ring 8 consist of a non-conductive material. Alternatively, at least the additional ring 9 can have a surface which is made non-conductive. This feature makes it possible to arrange the additional ring 9 and the first fluid ring 8 close to the first winding head 5 without any risk of spark-over, and thereby the creeping distance to surrounding components can be maintained without any negative influences on the effectiveness of the cooling. This also enables fitting in a previously free component space filled with air. In that way, no extra fitting space requirements are needed, so that the surrounding components can continue being used in their previous configuration.

Moreover, the cooling arrangement 1, according to the invention, comprises a second fluid ring 14, as shown in FIG. 4. This is also arranged on the stator yoke 3, opposite the first fluid ring 8. The second fluid ring 14 is also designed to carry oil.

The second fluid ring 14 is again arranged on the stator yoke 3 by bonding with an adhesive. Thereby, a material-merged joint can be produced.

The second fluid ring 14 is centered on the stator yoke 3. In particular, the stator yoke 3 can be made in the form of a sheet pack of ring-shaped stator sheets stacked in the axial direction A. The centering of the second fluid ring 14 is then done relative to the sheet pack, so that tolerances can be summed up directly from the components directly involved.

Likewise, the second fluid ring 14 can be made of a non-conductive material. In fact, the second fluid ring 14 can either consist of a non-conductive material or at least have a non-conductive surface.

This feature makes it possible to arrange the second fluid ring 14 close to the second winding head 6 without any risk of spark-over, and thereby the creeping distance to surrounding components can be maintained without any negative influences on the effectiveness of the cooling. This also enables fitting in a previously free component space filled with air. In that way, no extra fitting space requirements are needed, so that the surrounding components can continue being used in their previous configuration.

The cooling arrangement 1, according to the invention, comprises a plurality of axial stator ducts. These are shown in FIG. 4.

The axial stator ducts extend from the first fluid ring 8 to the second fluid ring 14, or the other way round, and are designed to convey oil between the first fluid ring 8 and the second fluid ring 14.

In this case, first axial stator ducts 15 extend between the first fluid ring 8 and the second fluid ring 14 for transporting the oil from the first fluid ring 8 to the second fluid ring 14.

The second fluid ring 14 has redirection ducts 17 integrated in or on the second fluid ring 14. The first axial stator ducts 15 are arranged so that the said first axial stator ducts 15 lead into the redirection ducts 17. The redirection ducts 17 redirect the oil flowing in from the first axial stator ducts 15. For this, the redirection ducts 17 are designed and arranged such that they lead into second axial stator ducts 18.

The first axial stator ducts 15 and the second axial stator ducts 18 are geometrically identical. The fluid flowing from the first fluid ring 8 through the first axial stator ducts 15 to the second fluid ring 14 is directed into the second axial stator ducts 18 by the redirection ducts 17, and then flows back through the second axial stator ducts 18 into the first fluid ring 8.

Figure 1:
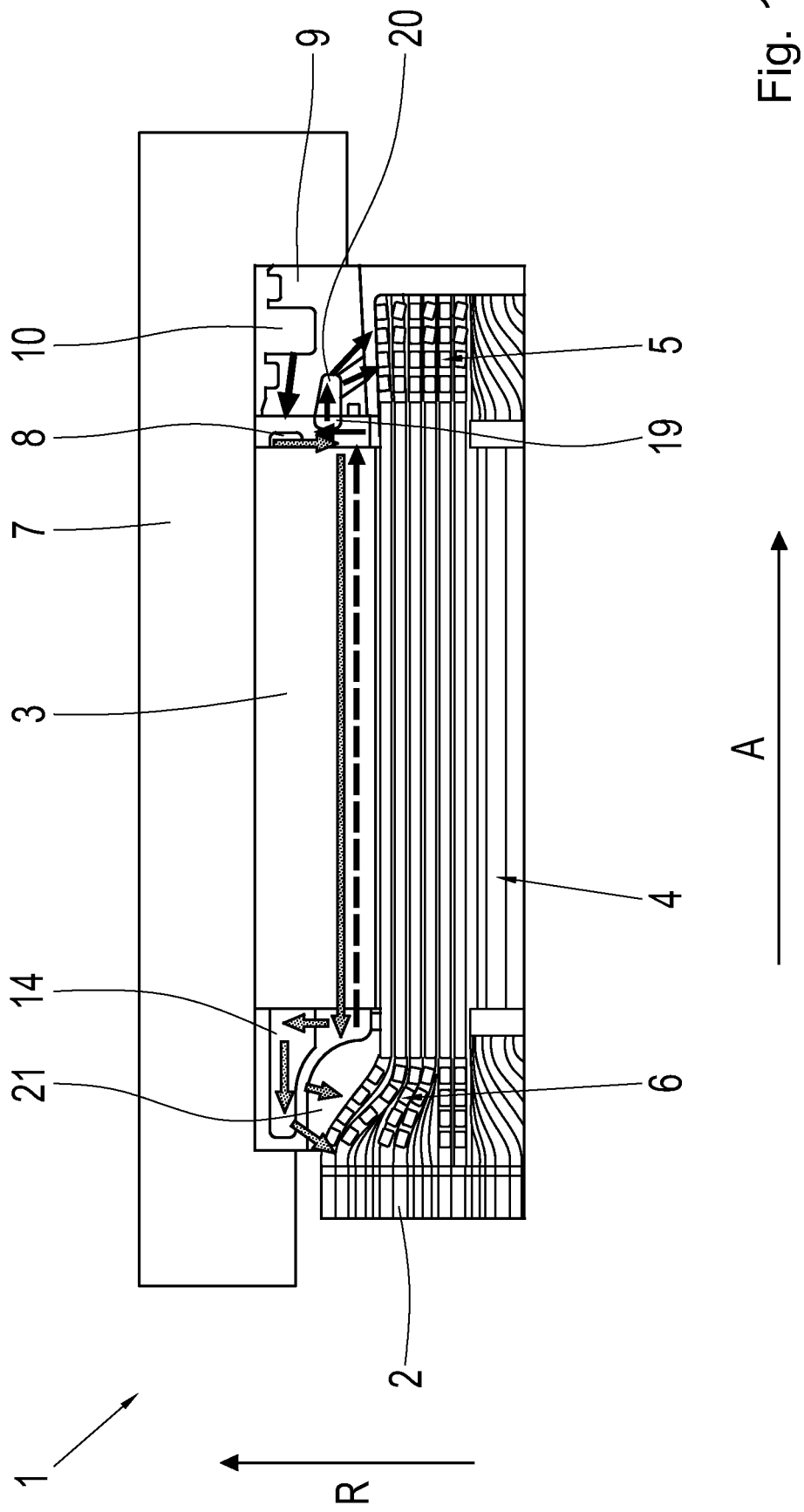
FIG. 1: A cooling arrangement according to the invention, in cross-section.

The first fluid ring 8 has an all-round closed lower ring duct 19 (FIG. 1), and the second axial stator ducts 18 are arranged in such a manner that they lead into the said lower ring duct 19 (FIG. 1). Thus, the lower ring duct 19 (FIG. 1) is integrated in the first fluid ring 8 and is designed to convey oil. Thus, the first fluid ring 8 comprises two (annular) ducts, one for the oil flowing in from the additional ring 9 and one into which the second axial stator ducts 18 open. In the lower ring duct 19 (FIG. 1) the oil from the second axial stator ducts 18 is brought together.

In addition, the lower ring duct 19 (FIG. 1) has first outlet openings 20 (FIGS. 1 and 2). These outlet openings 20 (FIGS. 1 and 2) are positioned radially above the first winding head 5, so that the first winding head 5 can be cooled by the oil flowing out of them.

Radially above means that the said first outlet openings 20 are on a larger radius than the winding heads, relative to the rotational axis Rot. The oil drops along the first winding head 5 and cools it. Thus the first winding head 5 is oiled in its upper area, so that the oil flows along the winding head 5 and cools it.

By virtue of the arrangement of the first outlet openings 20 (FIGS. 1 and 2) and having regard to gravity, the oil emerges virtually without the need for pressure.

Thanks to this interconnection between the first fluid ring 8, the first axial stator ducts 15 and the second axial stator ducts 18 with one another and with the first outlet openings 20 it is possible, using the same oil, on the one hand to cool the stator yoke 3 and stator grooves 4, and also to cool the first winding head 5.

In that way, efficient cooling can be achieved with little oil.

If the winding head diameter of the first winding head is small, a one-piece design of the first fluid ring 8 with the additional ring 9 is possible. These can be fitted retroactively (with the frame seal 16) onto the end of the stator yoke 3 or pushed over the winding head 5. The first fluid ring 8 can then be bonded onto the stator yoke 3. If the first fluid ring 8 and the additional ring 9 are made as one piece, they can be arranged together (without the O-ring seal 16) on the stator yoke 3.

FIG. 4 shows further, third axial stator ducts 22, which lead from the first fluid ring 8 to the second fluid ring 14 and pass oil into the second fluid ring 14. These do not lead—like the first axial stator ducts 15—into the redirection ducts 17, but rather, directly into the second fluid ring 14. The second fluid ring 14 has second outlet openings 21, which can be seen in FIG. 1 Here, the second outlet openings 21 (FIG. 1) are positioned radially above the second winding head 6 (FIG. 1), so that the second winding head 6 (FIG. 1) can be cooled by oil emerging or flowing out. The oil drops along the second winding head 6 and cools it. In this case too, radially above means that the second outlet openings 21 are on a larger radius than the winding heads relative to the rotational axis Rot.

Thus, the second winding head 6 (FIG. 1) is oiled in its upper area, and the oil flows along the second winding head 6 (FIG. 1) and cools it. By virtue of the arrangement of the second outlet openings 21 (FIG. 1) radially above the second winding head 6 (FIG. 1), the oil can emerge almost without the action of pressure.

Thanks to this interconnection of the first fluid ring 8, the second fluid ring 14 in combination with the third axial stator ducts 22 and the second outlet openings 21 (FIG. 1), it is possible using the same oil, on the one hand, to cool the stator yoke 3 (FIG. 1) and, on the other hand, to cool the second winding head 6 (FIG. 1).

In that way, efficient cooling can be achieved with little oil.

If the winding head diameter of the second winding head 6 is large—as shown here in FIG. 1—the second fluid ring 14 can be made in two parts, as two half-rings. In that way, retroactive bonding to the stator yoke 3 is still possible.

In that case, the second outlet openings 21 (FIG. 1) are arranged in the respective half-rings in such a manner that sprinkling of the second winding head 6 is possible. This means that the second outlet openings 21 (FIG. 1) is a function of the multi-component structure of the second fluid ring 14.

Preferably, both the first outlet openings 20 (FIG. 1) and the second outlet openings 21 (FIG. 1) are in the form of outlet bores. These can be made particularly simply.

As can be seen more precisely in FIG. 4, the first axial stator ducts 15, the second axial stator ducts 18 and the third axial stator ducts 22 are preferably made geometrically identical or virtually identical and are arranged parallel to one another. This means that each of the axial stator ducts contains half of the oil fed in through the stator housing 7 and the additional ring 9.

Thus, half of the oil flowing in through the third axial stator ducts 22 is passed to the second outlet openings 21.

Furthermore, half of the oil flowing in passes through the first axial stator ducts 15 and the second axial stator ducts 18 and the redirection ducts 17. This means that the first axial stator ducts 15 and the second axial stator ducts 18 each contain half of the oil coming in and by way of the second axial stator ducts 18 that oil is passed on to the first outlet openings 20.

This enables a uniform sprinkling of the first winding head 5 (FIG. 1) and the second winding head 6 (FIG. 1) with the same quantity of oil.

FIG. 5 shows an electric machine 23 according to the invention. This comprises a stator 2. The stator 2 has stator grooves 4 (FIG. 1). In addition the stator 2 has a stator yoke 3. In the stator yoke 3 are formed first axial stator ducts 15, second axial stator ducts 18 and third axial stator ducts 22 (FIG. 4), which extend from a first fluid ring 8 (FIG. 1) to a second fluid ring 14 (FIG. 1) and are designed to convey a cooling fluid, in this case oil.

The first axial stator ducts 15, second axial stator ducts 18 and third axial stator ducts 22 (FIG. 4) are preferably arranged in the area of the stator grooves 4 (FIG. 4), i.e., close to the stator grooves 4 (FIG. 4), without endangering the leak-tightness.

In that way, the stator yoke 3, and above all the windings in the stator grooves 4 (FIG. 1), can be cooled particularly effectively.

A first fluid ring 8 (FIG. 1) is arranged on the stator yoke 3, at the end (counter-switching side). In addition, at the opposite end (switching side) a second fluid ring 14 (FIG. 1) is arranged, in particular adhesively bonded on. The two fluid rings 8 and 14 (FIG. 1) are designed to convey a fluid, in this case oil. The two fluid rings 8 and 14 (FIG. 1) can be centered and orientated relative to the stator yoke 3 and stator fixing elements 24 (FIG. 4) arranged on the stator 2.

An additional ring 9 (FIG. 1) is arranged on the first fluid ring 8. This has a fluid groove 10 (FIG. 2), through which oil can flow out of the stator housing 7 (FIG. 1) into the additional ring 9 (FIG. 1). A seal 11 (FIG. 1) is arranged between the stator housing 7 and the additional ring 9, which prevents the oil from flowing out. The additional ring 9 (FIG. 1) has axial perforations, the breakthrough ducts 12 (FIG. 3), which transport the fluid, in this case oil, from the oil groove 10 (fluid groove) to the first fluid ring 8. For this, the first fluid ring 8 has openings 13, for example slots, through which the oil can flow into the first fluid ring 8.

Furthermore, the frame seal 16 (FIG. 3) is arranged between the additional ring 9 (FIG. 3) and the first fluid ring 8. The first fluid ring 8 is fixed by bonding onto the stator yoke 3, and the additional ring 9 by being pressed on by the stator housing 7.

In the stator yoke 3, near the stator grooves 4 (FIG. 1) first axial stator ducts 15, second axial stator ducts 18 and third axial stator ducts 22 are provided, which extend between the first fluid ring 8 and the second fluid ring 14 for the exchange of fluid. In this case, the first axial stator ducts 15, second axial stator ducts 18 and third axial stator ducts 22 (FIG. 4) are arranged parallel to one another and are made geometrically similar, i.e., they can each transport the same quantity of oil.

In or on the second fluid ring 14 (FIG. 4) redirection ducts 17 (FIG. 4) are arranged, in which oil flows through the first axial stator ducts 15 and is led into the second axial stator ducts 18 and flows back to the first fluid ring 8. In that way, a segmented transfer is possible.

There, the oil emerges into a lower ring duct 19 (FIG. 1), which has outlet openings 20 (FIG. 1) to let out the oil. These are, in each case, arranged radially above the first winding head 5 and sprinkle the latter to cool it by means of the oil. The third axial stator ducts 22 open into the second fluid ring 14 (FIG. 1), which has second outlet openings 21 (FIG. 1) which are also arranged radially above the second winding head 6 (FIG. 1) in order to sprinkle the second winding head 6 (FIG. 1) and to cool it with oil.

This enables efficient cooling of the stator yoke 3, the windings in the stator grooves 4 (FIG. 1) and also the first winding head 5 and the second winding head 6.

By making the first fluid ring 8, the additional ring 9 and the second fluid ring 14 out of a non-conductive material or with a coating or formation of the respective surfaces which is non-conductive, these can be arranged close to the winding heads 5, 6. Thanks to this design, the previously necessary insulation space, which is required owing to the current-carrying windings, can still be maintained.

Moreover, in this way, the creeping distance to surrounding components can be maintained without adverse effects on the effectiveness of the cooling.

Thanks to the cooling arrangement 1 according to the invention, cooling can be achieved without axial or radial fitting space having to be provided or modified. The components around the structure can, therefore, remain the same. In particular, by feeding in the oil from only one end side of the stator yoke 3 (FIG. 1), the existing fitting space can be used to optimum effect.

Thanks to the cooling arrangement according to the invention, an outer diameter of the stator 2 is not affected. Rather, by the omission of a water-cooling jacket the outer diameter of the stator 2, i.e., the stator 2 itself, can be made larger for the optimum utilization of the volume available, and the efficiency increased thereby.

By virtue of the to-and-fro movement of the oil flow, the volume flow can be reduced. Thus, already with a relatively small quantity, for example 8 l/min, the stator 2 can be cooled and, at the same time, so too can the winding heads 5, 6.

By adhesively bonding the first fluid ring 8 and the second fluid ring 14 onto the stator yoke 3, retroactive fitting is possible. Moreover, with radially oversized winding heads a two-part design of a fluid ring 8, 14, each with respective corresponding outlet openings 21, 22 can be used, without adverse effect on the cooling arrangement 1 according to the invention.

The electric machine 23 also comprises a rotor 25, which is mounted rotatably around a rotational axis Rot. This can drive a transmission 26.

INDEXES

1 Cooling arrangement
2 Stator
3 Stator yoke
4 Stator grooves
5 First winding head
6 Second winding head
7 Stator housing
8 First fluid ring
9 Additional ring
10 Fluid groove
11 Seal
12 Breakthrough ducts
13 Openings
14 Second fluid ring
15 First axial stator ducts
16 Frame seal
17 Redirection ducts
18 Second axial stator ducts
19 Lower ring duct
20 First outlet opening 21 Second outlet opening
22 Third axial stator ducts
23 Electric machine
24 Stator fixing means
25 Rotor
26 Transmission

The invention claimed is:

1. A cooling arrangement for cooling a stator for an electric machine, the cooling arrangement comprising:
a stator which is fixedly mounted relative to a rotational axis,
wherein the rotational axis defines an axial direction and a radial direction which is radial relative to the rotational axis,
the stator has a stator yoke and stator grooves,
the stator yoke extends around the rotational axis in the radial direction and in the axial direction,
the stator grooves in the stator yoke are arranged facing toward the rotational axis,
the stator grooves extend in the axial direction,
windings are formed in the stator grooves, which windings form a first winding head and a second winding head, respectively, in the axial direction at the ends,
a first fluid ring and a second fluid ring are provided,
the first fluid ring is arranged at one end on the stator yoke and the second fluid ring is arranged on the stator yoke at an opposite end,
the first fluid ring has first and second annular ducts, at least one inlet opening and at least one outlet opening,
the at least one inlet opening facilitates a flow of fluid in from a stator housing which at least partially surrounds the stator, and
in the axial direction the stator yoke has a plurality of axial stator ducts which are designed in such a manner that the fluid flowing in can flow through a first of the plurality of stator ducts from the first fluid ring to the second fluid ring, and the second fluid ring is designed to receive and redirect the fluid through a second of the plurality of stator ducts to the at least one outlet opening of the first fluid ring, the first and the second annular ducts of the first fluid ring being arranged such that the fluid flows from the at least one inlet opening through the first annular duct to the first stator duct and flows from the second stator duct through the second annular duct to the at least one outlet opening.

2. The cooling arrangement according to claim 1, wherein a further all-round additional ring is provided on the first fluid ring, on a side facing away from the stator yoke, which has an all-round fluid groove open toward the stator housing for receiving the fluid from the stator housing.

3. The cooling arrangement according to claim 2, wherein the first fluid ring has at least one opening and the additional ring has at least one breakthrough duct from the fluid groove to the at least one opening for the fluid to flow in from the fluid groove into the first fluid ring, so that the at least one inlet opening is formed by the fluid groove, the at least one breakthrough duct and the at least one opening.

4. The cooling arrangement according to claim 2, wherein at least the additional ring has a surface and at least the surface comprises an insulating, non-conductive material.

5. The cooling arrangement according to claim 2, wherein the additional ring comprises an insulating, non-conductive material.

6. The cooling arrangement according to claim 2, wherein the first fluid ring and the additional ring are made integrally as one piece.

7. The cooling arrangement according to claim 2, wherein the first fluid ring and the additional ring are made as two separate components, and the additional ring is arranged and designed such that the additional ring can be pressed by the stator housing against the first fluid ring in the axial direction.

8. The cooling arrangement according to claim 1, wherein redirection ducts are provided in or on an additional ring, and first axial stator ducts are arranged so that the first axial stator ducts communicate with the redirection ducts, the redirection ducts are arranged in such a manner that the redirection ducts communicate with second axial stator ducts, so that fluid flowing from the first fluid ring through the first axial stator ducts to the second fluid ring is redirected by the redirection ducts and flows back through the second axial stator ducts to the first fluid ring.

9. The cooling arrangement according to claim 8, wherein the first fluid ring has an all-round closed lower ring duct, and the second axial stator ducts are arranged so that the second axial stator ducts open into the lower ring duct.

10. The cooling arrangement according to claim 9, wherein the lower ring duct has first outlet openings.

11. The cooling arrangement according to claim 10, wherein the first outlet openings are positioned radially above the first winding head, relative to the rotational axis, so that wetting of the first winding head by the fluid flowing through the first outlet openings occurs.

12. The cooling arrangement according to claim 8, wherein third axial stator ducts are arranged so that the third axial stator ducts open into the second fluid ring and the second fluid ring has second outlet openings.

13. The cooling arrangement according to claim 12, wherein the second outlet openings are positioned radially above the second winding head, relative to the rotational axis, so that wetting of the second winding head by the fluid flowing through the second outlet openings occurs.

14. The cooling arrangement according to claim 12, wherein the number of first axial stator ducts is equal to the number of third axial stator ducts and the number of second axial stator ducts is equal to the number of first axial stator ducts.

15. The cooling arrangement according to claim 1, wherein the second fluid ring is made as two parts.

16. The cooling arrangement according to claim 1, wherein the axial stator ducts are arranged in an area of the stator grooves.

17. The cooling arrangement according to claim 1, wherein the fluid is oil.

18. The cooling arrangement according to claim 1, wherein the first fluid ring and the second fluid ring are adhesively bonded to the stator yoke.

19. An electric machine with the cooling arrangement according to claim 1 for operating a vehicle.

* * * * *